United States Patent
Lin et al.

(10) Patent No.: US 10,703,978 B2
(45) Date of Patent: Jul. 7, 2020

(54) COMPOSITION FOR BIOMASS OIL, AND PREPARATION METHOD AND USE THEREOF

(71) Applicant: Beijing Huashi United Energy Technology and Development Co., Ltd., Beijing (CN)

(72) Inventors: Ke Lin, Beijing (CN); Lin Li, Beijing (CN); Lixin Guo, Beijing (CN); Yongjun Cui, Beinjing (CN); Lilong Jiang, Beijing (CN)

(73) Assignee: Beijing Huashi United Energy Technology and Development Co., Ltd., Beijing (CN)

( * ) Notice: Subject to any disclaimer, the term of this patent is extended or adjusted under 35 U.S.C. 154(b) by 0 days.

(21) Appl. No.: 15/795,377

(22) Filed: Oct. 27, 2017

(65) Prior Publication Data

US 2018/0142157 A1    May 24, 2018

(30) Foreign Application Priority Data

Nov. 21, 2016 (CN) .......................... 2016 1 1039293

(51) Int. Cl.
*C10B 53/02* (2006.01)
*C10G 47/26* (2006.01)
*C10G 1/08* (2006.01)

(52) U.S. Cl.
CPC .............. *C10B 53/02* (2013.01); *C10G 1/086* (2013.01); *C10G 47/26* (2013.01); *C10G 2300/1014* (2013.01); *Y02E 50/14* (2013.01); *Y02P 30/20* (2015.11)

(58) Field of Classification Search
CPC ... C10G 1/06; C10G 1/00; C10G 3/50; C10G 1/086; C10G 47/26; C10G 2300/1014; C10B 53/02; Y02E 50/14; Y02P 30/20
USPC ........................................................ 585/242
See application file for complete search history.

(56) References Cited

U.S. PATENT DOCUMENTS

| | | | |
|---|---|---|---|
| 6,814,940 B1 | 11/2004 | Hiltunen et al. | |
| 2011/0167713 A1* | 7/2011 | Quignard ................ | C10G 1/08 44/307 |
| 2012/0266525 A1* | 10/2012 | Gosselink .............. | C10B 49/22 44/307 |
| 2014/0096438 A1* | 4/2014 | Lange .................. | B01J 37/0242 44/307 |

FOREIGN PATENT DOCUMENTS

| | | | |
|---|---|---|---|
| CN | 1307926 A | 8/2001 | |
| CN | 101045875 A | 10/2007 | |
| CN | 101547969 A | 9/2009 | |
| CN | 201351763 Y | 11/2009 | |
| CN | 102051194 A | 5/2011 | |
| CN | 102127462 A | 7/2011 | |
| CN | 102199435 A | 9/2011 | |
| CN | 102203215 A | 9/2011 | |
| CN | 102310005 A | 1/2012 | |
| CN | 103242871 A * | 8/2013 | |
| CN | 103597058 A | 2/2014 | |
| CN | 104096563 A * | 10/2014 | |
| CN | 204051658 U | 12/2014 | |
| CN | 104388117 A | 3/2015 | |
| CN | 104531200 A | 4/2015 | |
| CN | 104588079 A | 5/2015 | |
| CN | 204526627 U | 8/2015 | |
| RU | 2384602 C2 | 3/2010 | |
| WO | WO-2015/145279 A1 | 10/2015 | |
| WO | WO-2015145279 A1 * | 10/2015 | ............... C10L 1/02 |

OTHER PUBLICATIONS

Zhang, D. (Machine translation of CN103242871, pp. 1-10). (Year: 2013) (Year: 2013).*
Meier, D., et. al. "Effect of hydrogen pressure on yields and quality of oils obtained from direct liquefaction of pine wood", Elsevier Appl. Sci. Publishers London New York, (1989); pp. 584-592. (Year: 1989) (Year: 1989).*
Toritimber ("Saw Dust" (May 15, 2016)). (Year: 2016) (Year: 2016).*
MMCC ("Mesh to Micron Conversion Chart"; pp. 1-8, (May 3, 2008)) (Year: 2008) (Year: 2008).*
Li (Machine translation of CN 104096563) (Year: 2014) (Year: 2014).*
Office Action from Patent Office in China for related Chinese Application No. 201611039293.X, dated Jun. 28, 2019, 21 pages.
Second Chinese Office Action from counterpart CN201611039293X, dated Feb. 21, 2020.

* cited by examiner

*Primary Examiner* — Youngsul Jeong
*Assistant Examiner* — Jason Y Chong
(74) *Attorney, Agent, or Firm* — Harness, Dickey & Pierce, P.L.C.

(57) ABSTRACT

The present invention provides a composition for biomass oil, and a preparation method and use thereof. The composition comprises a biomass and a liquid oil, wherein, based on weight of the biomass, the biomass has a moisture content of 3 wt % to 18 wt %. The biomass is mixed with the liquid oil to obtain a liquid mixture, i.e., the composition for biomass oil. According to the use of the composition for biomass oil in preparation of biomass oil, high-pressure high-temperature hydrolysis is carried out by using water in the biomass, and the polycondensation of coke is avoided under the co-action of hydrogen gas and a catalyst, so that the yield of the coke is lowered, and the yield of the biomass oil is increased.

2 Claims, No Drawings

COMPOSITION FOR BIOMASS OIL, AND PREPARATION METHOD AND USE THEREOF

CROSS-REFERENCE TO RELATED APPLICATIONS

This application claims priority to Chinese Serial No. 201611039293.X filed Nov. 21, 2016. The entire disclosure of the above application is incorporated herein by reference.

FIELD

The present invention relates to the technical field of biological energy conversion, and particularly to a one-pot liquefaction process for biomass.

BACKGROUND

This section provides background information related to the present disclosure which is not necessarily prior art.

With rapid development of the social economy, the fossil non-renewable energy, such as coal, crude oil, natural gas, oil shale and the like, is exhausted day by day, and environmental pollution caused by contaminants, such as $CO_2$, $SO_2$, $NO_x$ and the like, generated after the fossil non-renewable energy is burnt, is serious day by day, so that the human beings have to seriously consider energy access ways and environment improvement methods. A biomass is a renewable energy, which has huge potential and advantages in the aspects of meeting energy demands, reducing environment pollution and improving an energy structure. The biomass means all organic substances formed by directly or indirectly using the photosynthesis of green plants, including plants, animals, microorganisms and excretions and metabolites thereof, and the biomass has renewability, low pollution and wide distributivity. In recent years, conversion and utilization of the biomass energy are developed in directions of high efficiency and cleanness, wherein a biomass liquefaction process is an important part. The existing biomass liquefaction process are mainly divided into indirect liquefaction and direct liquefaction, wherein the direct liquefaction is to directly liquefy a biomass from a solid to a liquid under a suitable temperature and a suitable pressure by carrying out hydrolysis and supercritical liquefaction or introducing hydrogen, inert gas and the like under the action of a solvent or a catalyst. The biomass direct liquefaction process mainly comprises pyrolysis liquefaction, catalytic liquefaction, pressurized hydroliquefaction and the like, wherein especially products of pressurized hydroliquefaction have high yield and good quality, but the pressurized hydroliquefaction has harsh high-pressure liquefaction reaction conditions, and the pressurized hydroliquefaction further comprises very complex working procedures, such as solid material drying, crushing, slurry preparing, heating, pressurizing, reacting, separating and the like. For example, Chinese patent CN103242871A discloses a heavy oil and biomass hydrogenation co-liquefaction treatment process, and the process comprises the steps of pre-crushing a dried biomass to be 40-100-mesh, mixing the pre-crushed biomass of 40-100-mesh with a heavy oil to form a slurry, adding a catalyst and a vulcanizing agent into the slurry, placing the mixture in a slurry bed hydrogenation reactor to undergo a hydrogenation and thermal cracking reaction, wherein the reaction is controlled to be carried out under a temperature of 370-430 DEG C. and a partial pressure of hydrogen of 4-8 MPa, and fractioning the reaction product, thereby obtaining a bio-oil and coke.

Although the above-mentioned process can improve the conversion rate of the biomass to 90 wt % or above and the yield of an oil phase to 70 wt % or above, the process is relatively higher in reaction temperature and relatively smaller in partial pressure of hydrogen, thereby causing relatively lower efficiency of reactions, such as hydrolysis, cracking, hydrogenation and the like, finally causing a relatively larger rate of coke formation, and definitively causing a low yield of a liquid phase. Therefore, a technical problem to be urgently solved by those skilled in the art is to improve the existing biomass liquefaction process so as to overcome the defects of low reaction efficiency and a large rate of coke formation.

SUMMARY

This section provides a general summary of the disclosure, and is not a comprehensive disclosure of its full scope or all of its features.

Therefore, technical problems to be solved in the present invention are that in a process for producing a biomass oil by using a biomass in the prior art, a polycondensation reaction easily occurs and produces a large amount of coke, and a biomass pretreatment process is complicated and tedious.

According to the present invention, a biomass with a certain moisture content and a liquid oil product are mixed to serve as a composition for biomass oil, high-pressure and high-temperature hydrolysis is carried in a biomass oil production process by using water in the biomass, breaking of C—C bonds, C—O bonds and C—N bonds is facilitated under the co-action of hydrogen and a catalyst, link-broken ions are bonded to free hydrogen protons, and bonding of free radicals is terminated promptly, so that the polycondensation of coke is avoided, the yield of coke is lowered, and the yield of biomass oil is further increased.

In order to solve the above-mentioned technical problem, in a first aspect, the present invention provides a composition for biomass oil, the composition comprising:

a biomass, and a liquid oil, wherein, based on weight of the biomass, the biomass has a moisture content of 3 wt % to 18 wt %.

Preferably, the biomass has a moisture content of 5 wt % to 10 wt %, preferably a moisture content of 8 wt %.

Preferably, the biomass accounts for 10-40 parts by weight based on a total of 100 parts by weight of the composition.

Preferably, the biomass accounts for 30-40 parts by weight.

Preferably, the liquid oil is at least one selected from a group consisting of vegetable oil, animal oil, coal tar, petroleum and biomass oil.

Preferably, the biomass oil is prepared from the biomass through hydrolysis, cracking and hydrogenation.

Preferably, the biomass is in form of solid particles which have a volume particle size distribution range of 1 to 5,000 microns, preferably 20 to 200 microns.

Preferably, the composition further comprises a hydrocracking catalyst and a vulcanizing agent, wherein, based on a total of 100 parts by weight of the composition, the hydrocracking catalyst is added in an amount of 0.1-10 parts by weight, preferably 2-5 parts by weight, and the vulcanizing agent is added in an amount of 0.1-0.5 part by weight.

Preferably, the hydrocracking catalyst comprises one or more selected from a group consisting of amorphous iron oxide hydroxide, biomass charcoal loading an active component and amorphous aluminum oxide loading an active component, wherein the active component comprises one or more selected from oxides of metals of group VIB, group VIIB and group VIII in the periodic table of elements.

In a second aspect, the present invention provides a method for preparing the composition for biomass oil, the method comprising a step of mixing a biomass with a liquid oil to obtain a liquid mixture, wherein, based on weight of the biomass, the biomass has a moisture content of 3 wt % to 18 wt %, and preferably, the biomass has a moisture content of 5 wt % to 10 wt %.

Preferably, the biomass and the liquid oil are mixed according to a proportion that the biomass accounts for 10-40 parts by weight, preferably 30-40 parts by weight, based on a total of 100 parts by weight of the composition.

Preferably, firstly, the biomass is mixed with a hydrocracking catalyst and a vulcanizing agent to form a mixture; and then, the mixture is mixed with the liquid oil, thereby forming the composition for biomass oil. Based on a total of 100 parts by weight of the composition, the hydrocracking catalyst is added in an amount of 0.1-10 parts by weight, preferably 2-5 parts by weight, and the vulcanizing agent is added in an amount of 0.1-0.5 part by weight. The hydrocracking catalyst comprises one or more selected from a group consisting of amorphous iron oxide hydroxide, biomass charcoal loading an active component and amorphous aluminum oxide loading an active component, wherein the active component comprises one or more selected from oxides of metals of group VIB, group VIIB and group VIII in the periodic table of elements.

In a third aspect, the present invention provides use of the composition for biomass oil in preparation of biomass oil.

In a fourth aspect, the present invention provides a biomass oil which is prepared from the composition for biomass oil according to any one in the first aspect, or is prepared by the method according to any one in the second aspect.

The technical scheme of the present invention has the following advantages.

1. According to the composition for biomass oil, provided by the present invention, the composition comprises a biomass and a liquid oil, and the biomass has a moisture content of 3 wt % to 18 wt %. In a process for producing the biomass oil from the composition for biomass oil, provided by the present invention, through hydrolysis, cracking and hydrogenation, the biomass is not required to be subjected to excessive drying and dehydrating, so that pretreatment procedures for the biomass are considerably simplified. More importantly, exactly due to the presence of a certain amount of moisture in the biomass, the biomass can be subjected to high-pressure and high-temperature hydrolysis fully, meanwhile, active hydrogen on a catalyst hydrogenation metal surface and active hydrogen produced during a reaction between CO and water make up immediately at the moment of link breaking, the condensation of long links cannot occur, the polycondensation reaction producing coke is avoided, and the yield of the biomass oil is increased.

2. According to the composition for biomass oil, provided by the present invention, preferably, the biomass has a moisture content of 5 wt % to 10 wt %, so that the hydrolysis effect can be further optimized, then, the polycondensation reaction producing coke is further avoided, and the yield of the biomass oil is increased.

3. According to the composition for biomass oil, provided by the present invention, the biomass accounts for 10-40 parts by weight, preferably 30-40 parts by weight, based on a total of 100 parts by weight of the composition, so that the proportioning ratio of the biomass is increased, and the production cost is reduced.

4. According to the composition for biomass oil, provided by the present invention, the liquid oil is at least one selected from a group consisting of vegetable oil, animal oil, coal tar, petroleum and biomass oil. The liquid oil is wide in applicable scope and source, thereby bringing convenience to industrial production.

5. According to the composition for biomass oil, provided by the present invention, the biomass is in form of solid particles which have a volume particle size distribution range of 1 to 5,000 microns, preferably 20 to 200 microns. A reaction can be performed more fully due to the particle size distribution.

6. The composition for biomass oil, provided by the present invention, further comprises a hydrocracking catalyst and a vulcanizing agent, the occurrence of a polycondensation reaction producing coke can be avoided under the hydrocracking action of hydrogen and a vulcanized catalyst, and then, the yield of the biomass oil can be further increased.

7. According to the method for preparing the composition for biomass oil, provided by the present invention, the biomass is firstly mixed with the hydrocracking catalyst and the vulcanizing agent to form a mixture prior to mixing the biomass with the liquid oil, so that the catalyst can be attached to the surface of the biomass by using surface energy of the biomass, then, hydrogen transfer is provided for a biomass hydrolyzate promptly, coke polycondensation cannot occur in a whole technological process, and the aim of reducing coke yield is achieved. Moreover, by the preparation method provided by the invention, the biomass is not required to be subjected to complete drying and dehydrating procedures, the method is easy and feasible, and the process cost is reduced.

Further areas of applicability will become apparent from the description provided herein. The description and specific examples in this summary are intended for purposes of illustration only and are not intended to limit the scope of the present disclosure.

DETAILED DESCRIPTION

Example embodiments will now be described more fully with reference to the accompanying drawings.

The technical scheme of the present invention is described below clearly and completely. Apparently, embodiments described are part of embodiments of the present invention, rather than all embodiments. All other embodiments achieved by those having ordinary skill in the art on the premise of not making inventive labor on the basis of the embodiments of the present invention all fall within the protection scope of the present invention.

A composition for biomass oil, provided by the present invention, means a biomass-containing composition and/or mixture for preparing biomass oil, and may be a solution, a slurry or a suspension.

According to the composition for biomass oil, provided by the present invention, the composition comprises a biomass and a liquid oil, wherein, based on weight of the biomass, the biomass has a moisture content of 3 wt % to 18 wt %. Preferably, the biomass has a moisture content of 5 wt % to 10 wt % based on weight of the biomass. The biomass accounts for 10-40 parts by weight, preferably 30-40 parts by weight, based on a total of 100 parts by weight of the composition. Preferably, the composition further comprises a hydrocracking catalyst and a vulcanizing agent. Preferably, based on a total of 100 parts by weight of the composition, the hydrocracking catalyst is added in an amount of 0.1-10 parts by weight, preferably 2-5 parts by weight, and the vulcanizing agent is added in an amount of 0.1-0.5 part by weight.

Active components of conventional hydrocracking catalysts can all be used in the present invention, favorable active components comprise, but are not limited to, one or more selected from hydrogenation-active compounds of transition metals of group VI, group VII and group VIII in the periodic table of elements, such as one or more selected from a group consisting of amorphous iron oxide hydroxide, biomass charcoal loading an active component and amorphous aluminum oxide loading an active component, preferably, aluminum oxide loading molybdenum oxide and nickel oxide. In order to make the hydrocracking catalyst active during reaction, a vulcanizing agent, comprising, but not limited to, sulfur, carbon disulfide and dimethyl disulfide and other common vulcanizing agents in the art, is required to be simultaneously added into the composition for biomass oil.

In the present invention, the biomass mainly means substances such as lignocellulose (lignin for short) such as stalks and trees except for grains and fruits in a farming and forestry production process, leftovers of the agricultural product processing industry, farming and forestry wastes and poultry and livestock faeces and wastes of an animal husbandry production process, comprises stalks of various crops and industrial crops, reeds, trees, tree leaves, algae, vegetable oil, animal oil, swill-cooked dirty oil, animal faeces and so on, and may be feedstocks formed by one or more biomasses. Stalks of crops such as wheat, rice, corn and cotton and high-yield industrial crops such as reeds, pennisetum hydridum and wood sawdust are preferred. Preferably, the biomass is in form of solid particles which have a volume particle size distribution range of 1 to 5,000 microns, preferably 20 to 200 microns.

In the present invention, the liquid oil can be selected from a wide scope and may be at least one selected from a group consisting of vegetable oil, animal oil, coal tar, petroleum and biomass oil.

The present invention further provides a method for preparing the composition for biomass oil, the method comprising a step of mixing a biomass with a liquid oil to obtain a liquid mixture, wherein, based on weight of the biomass, the biomass has a moisture content of 3 wt % to 18 wt %, and preferably, the biomass has a moisture content of 5 wt % to 10 wt %. Preferably, the biomass and the liquid oil are mixed according to a proportion that the biomass accounts for 10-40 parts by weight, preferably 30-40 parts by weight, based on a total of 100 parts by weight of the composition.

A pretreatment procedure is carried out on the biomass prior to mixing the biomass with the liquid oil, and comprises the steps of drying the biomass until the moisture content of the biomass satisfies the above-mentioned requirements, then, crushing the dried biomass to obtain solid biomass particles which have a volume particle size distribution range of 1 to 5,000 microns, preferably 20 to 200 microns, and finally, carrying out dust removal treatment on the solid biomass particles.

The biomass is firstly mixed with the hydrocracking catalyst and the vulcanizing agent prior to mixing the biomass with the liquid oil, wherein, based on a total of 100 parts by weight of the composition, the hydrocracking catalyst is added in an amount of 0.1-10 parts by weight, preferably 2-5 parts by weight, and the vulcanizing agent is added in an amount of 0.1-0.5 part by weight.

The composition for biomass oil, provided by the present invention, is used in preparation of biomass oil. The biomass oil is prepared from the composition for biomass oil by a hydrogenation and hydrolysis process. Specifically, the biomass oil is produced through introducing hydrogen into the composition for biomass oil which is added with the hydrocracking catalyst, and subjecting the composition for biomass oil to hydrolysis under high-temperature and high-pressure conditions. Preferably, the biomass oil is produced through introducing hydrogen until the volume ratio of the hydrogen to the composition for biomass oil reaches (600 to 1,000):1 at a temperature of 250 DEG C. to 550 DEG C., then, carrying out hydrolysis, cracking and hydrogenation reactions for a period of 15 to 90 minutes. The conventional hydrogenation reactors can all be used in the present invention.

According to the biomass oil prepared from the composition for biomass oil, provided by the invention, the yield reaches 60% or more (on dry basis); the combustion performance is good, and the cetane number is greater than 47; the safety is good, and the flashing point is above 47 DEG C.; and the dynamic performance is good, and the calorific value is higher than 41 MJ/kg.

Embodiments for preparation of the composition for biomass oil

Embodiment 1

Wheat straws are dried until the wheat straws have a moisture content of 18 wt %, then, the dried wheat straws are crushed to obtain wheat straw particles which have a volume particle size distribution range of 20 to 200 microns, and finally, dust removal treatment is carried out on the wheat straw particles.

Based on a total of 100 parts by weight of the composition, 5 parts by weight of a hydrocracking catalyst (commercially-available amorphous iron oxide hydroxide) is mixed with the dedusted wheat straw particles, and meanwhile, 0.4 part by weight of sulfur is added as a vulcanizing agent. Then, the obtained mixture and a commercially-available peanut oil are mixed to obtain a mixed slurry according to a proportion that the wheat straw particles account for 35 parts by weight, based on a total of 100 parts by weight of the composition.

Embodiments 2 to 5

The embodiments 2 to 5 adopt processing procedures the same as those in the embodiment 1, and differences are as shown in the following table 1:

TABLE 1

|  |  | Embodiment 2 | Embodiment 3 | Embodiment 4 | Embodiment 5 |
|---|---|---|---|---|---|
| Biomass | Name | Reeds | Pine sawdust | Corn stalks | Wheat straws |
|  | Moisture content | 3 wt % | 10 wt % | 8 wt % | 6 wt % |
| Liquid oil |  | Lard oil | Coal tar (anthracene oil or washing oil) | Petroleum (wax oil fraction) | Biomass oil 1# |
| Weight proportion of biomass in oil product |  | 40 parts by weight | 30 parts by weight | 10 parts by weight | 20 parts by weight |
| Catalyst |  | 2 parts by weight | 10 parts by weight | 5 parts by weight | 8 parts by weight |
| Vulcanizing agent |  | 0.2 | 0.5 | 0.4 | 0.6 |

It should be noted that the biomass oil used in the embodiment 5 is biomass oil 4# obtained through subsequent hydrogenation and hydrolysis in the embodiment 4.

Comparative Examples 1 to 2

The comparative examples 1 to 2 adopt processing procedures the same as those in the embodiment 4, and differences are as shown in the following table 2:

TABLE 2

|  |  | Comparative example 1 | Comparative example 2 |
|---|---|---|---|
| Biomass | Name | Corn stalks | Corn stalks |
|  | Moisture content | 2.5 wt % | 25 wt % |

Embodiments of Use

Biomass oils are prepared from mixed slurries obtained in the embodiments 1 to 5 and the comparative examples 1 to 2 separately by the following method.

The mixed slurry is added into a slurry-bed hydrogenation reactor, and meanwhile, hydrogen is introduced into the hydrogenation reactor until the volume ratio of the hydrogen to the slurry reaches 800:1. Then, a reaction is carried out for a period of 60 minutes under a reaction temperature of 360 DEG C. and a partial pressure of hydrogen of 18 MPa.

The reacted material is subjected to oil-gas separation to obtain a biomass heavy oil, a biomass light oil and a non-condensable gas.

In an embodiment 6, biomass oil is prepared by the following method.

Based on a total of 100 parts by weight of the composition, 5 parts by weight of hydrocracking catalyst (amorphous iron oxide hydroxide) is added into the composition for biomass oil (the composition for biomass oil obtained in the embodiment 4), and meanwhile, 0.4 part by weight of sulfur is added into the composition for biomass oil as a vulcanizing agent, thereby obtaining a feedstock biomass slurry.

The feedstock biomass slurry is added into a slurry-bed hydrolysis and hydrogenation reactor, and meanwhile, hydrogen is introduced into the slurry-bed hydrolysis and hydrogenation reactor until the volume ratio of the hydrogen to the slurry reaches 800:1. Then, a reaction is carried out for a period of 60 minutes under a reaction temperature of 360 DEG C. and a partial pressure of the hydrogen of 18 MPa.

The reacted material is subjected to gas-oil separation to obtain a biomass heavy oil, a biomass light oil and a non-condensable gas.

The biomass oils obtained in the embodiments 1 to 5, the comparative examples 1 to 2 and the embodiment 6 are separately marked as 1#, 2#, 3#, 4#, 5#, 6#, 7# and 8#. Reaction results of all samples are as shown in the following table 3.

TABLE 3

|  | 1# | 2# | 3# | 4# | 5# | 6# | 7# | 8# |
|---|---|---|---|---|---|---|---|---|
| Conversion ratio of biomass, wt % | 95 | 93 | 96 | 98 | 97 | 87 | 91 | 94 |
| Yield of biomass oil (on dry basis of biomass), wt % | 66 | 62 | 67 | 72 | 69 | 43 | 47 | 61 |
| Coke yield, wt % | 0.5 | 0.9 | 0.3 | 0.1 | 0.2 | 7 | 9 | 1.0 |
| Oxygen content of biomass oil, wt % | 4.0 | 3.8 | 3.5 | 2.8 | 3.1 | 7.0 | 8.2 | 4.5 |

In the above table, a calculation formula for the conversion ratio of biomass oil is as follows: gas+biomass light oil+biomass heavy oil/biomass (dry basis).

A calculation formula for the yield of biomass oil is as follows: biomass light oil+biomass heavy oil/biomass (dry basis).

A calculation formula for coke yield is as follows: solid-state residue/biomass (dry basis).

The oxygen content of biomass oil is measured by gas chromatography-mass spectrography.

Apparently, the above-mentioned embodiments are only illustrated for distinct description, but are not intended to limit embodiments. For those having ordinary skill in the art, changes or variations of other different forms can also be made on the basis of the above-mentioned description. Herein, all embodiments are not required to and cannot be exhaustive. Readily apparent changes or variations evolved therefrom still fall within the protection scope of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for preparing a composition for biomass oil, the method comprising mixing a biomass with a hydrocracking catalyst and a vulcanizing agent to form a mixture; and then, mixing the mixture with a liquid oil, thereby forming the composition for biomass oil, wherein, based on weight of the biomass, the biomass has a moisture content of 3 wt % to 18 wt %, and wherein, based on a total of 100 parts by weight of the composition for biomass oil, the biomass accounts for 10 parts by weight, the hydrocracking catalyst accounts for 5 parts by weight, and the vulcanizing agent accounts for 0.4 parts by weight.

2. The method according to claim 1, wherein the biomass has a moisture content of 5 wt % to 10 wt %.

* * * * *